Patented May 13, 1941

2,241,875

UNITED STATES PATENT OFFICE 2,241,875

COMPOSITION

Carl Dame Clarke, Ruxton, Md.

No Drawing. Application October 7, 1938,
Serial No. 233,867

9 Claims. (Cl. 106—6)

The object of my invention is the providing a new plastic impression material suitable for making molds and casts of the human body, or its parts, which has a strength and flexibility far in excess of other compositions used for the same purpose.

A further object of my invention is an improved plastic impression material of substantially fixed form when used, and substantially free from liability to warp, shrink or crack.

A further object of my invention is an improved plastic substantially free from shrinkage, warping or cracking and which is durable in the solid form at ordinary temperatures.

A further object of my invention is the providing a material for molding and casting purposes which is relatively non-shrinkable in the solid form when exposed to air.

A further object of my invention is the providing a material for casting and molding purposes possessing the quality of great strength and flexibility, together with fluidity in its liquid form.

A further object of my invention is the providing a substance for molding and casting purposes which while in its liquid state has the ability to flow into the most minute details and smallest cavities, a term which I call fluidity, and which on setting will give an exact impression of these details, as there is no shrinkage from such details during the transition of the substance from the fluid to the set or solid form.

A further object of my invention is the providing a material for molding and casting purposes that will set at a temperature slightly above body temperature, and may be easily melted at a still higher temperature.

A further object of my invention is the providing a material for molding and casting purposes that remains definitely plastic at ordinary working temperature after becoming set so that it may be stretched away from undercut areas when cast around said areas, and after removal will return to the original shape and size.

With the foregoing and other objects in view, my invention consists of the methods employed, combination and arrangement of compounds and means as hereinafter specifically provided, but it is understood that changes, variations and modifications may be resorted to which come within the scope of the claims hereunto appended.

The subject matter of the present invention is a reversible hydrocolloidal composition which can serve for a great number of different purposes, especially for making molds of the oral, vaginal and rectal cavities, as well as for making impressions of various external and internal organs of living and dead bodies.

Heretofore known materials used for similar purposes have the following disadvantages, none of which are possessed by the present invention:

Their water content is so high that owing to evaporation they readily shrink and crack on exposure to the atmosphere. This shrinkage and friability results in a distorted impression in a matter of a few hours and lacks the ability to give a true mold or cast as far as size and shape are concerned.

Furthermore, other hydrocolloidal compositions used for the same purpose, that is, the molding and casting of the human body or its parts, lack sufficient strength or internal and external cohesion to hold together when removed from extensive undercuts. They break or crumble largely because of their high percentage of water. To overcome this difficulty fibrous material, such as cellucotton and cotton, are added as mechanical aids in holding the component parts of the impression together. These mechanical aids are not only unnecessary in the present invention, but are unnecessary in giving a true impression as well as in the technic of mixing and applying the composition. The present invention is many times stronger than other compositions used for the same purpose. In fact, tests have proved it to be more than a hundred times stronger in some instances, i. e., in tensile strength.

Another difficulty with other hydrocolloidal masses is that they flow too freely to remain on a vertical surface when reheated and applied by the novice. This is caused by the fact that the water content must be estimated and more water added as required by experience. The liquid contents of the present invention appear to be chemicals which do not evaporate at normal temperatures and humidities. Therefore, the addition or reduction of the water content by the worker becomes unnecessary. The material in the present invention can be used over and over again without the addition or reduction of liquids or solids of any kind, as it can be liquified by the application of heat.

Other compositions are said to contain rubber in the form of para rubber, which does not go into complete solution with the other water-soluble contents but acts only as a mechanical aid in holding the mass together. This ingredient is unnecessary in the present invention, as sufficient strength can be obtained without it.

The base of the present invention is a hexahydric alcohol. It is a hexahydric member of the polyhydric alcohol of which glycerin is the well-known trihydric alcohol. It is found in nature in the berries of the mountain ash, in pears, apples, cherries and other plants. It may also be produced by the electrolytic reduction of the abundant natural sugar, glucose or corn sugar.

Because it is desirable to have an impression composition to become liquid on heating and to set near body temperature (37.5° C.), a colloidal substance of certain seaweeds or similar plants, such as hai-thao or Chinese dschin-dschen are added. This causes the mixture to set at about 42° C., which is far enough above body temperature to prevent the possibility of the mixture remaining in a liquid form, yet it is not so high as to be uncomfortable to the living model owing to heat.

A mixture composed of the two above-mentioned substances would be too sluggish or have so much viscosity that the mixture would not flow into the smallest cavities and details. Therefore, a third ingredient is added in the form of clear, colorless, syrupy, odorless liquid, such as a trihydric alcohol (CH2OH2)CHOH. This ingredient reduces the viscosity and permits the heated mixture to flow into the finest details. However, this ingredient must not exceed thirty per cent of the composition for some purposes, otherwise the mixture will flow too readily.

A fourth ingredient may be added in the form of a salt, such as NaCl, which acts as a toughening and hardening agent. The amount of this ingredient should not exceed ten per cent for some purposes, otherwise the mixture will not flow as it should to give a good impression of fine details.

To allow for convenience in compounding, water may be added, much of which is evaporated after compounding. It is seldom necessary to use more than fifty per cent. In other compositions used for the same purposes the water content may exceed seventy per cent in the completed mixture. This water content causes the resulting mixture to be so friable that it has but a fraction of the strength of the present invention.

A sample mixture suitable for the purposes outlined is as follows, by weight:

| | Per cent |
|---|---|
| A hexahydric alcohol | 70 |
| A trihydric alcohol | 2 |
| A salt, such as NaCl | 3 |
| Mucilaginous vegetable matter | 10 |
| Water | 15 |
| | 100 |

I might state for clarification, that in the specification and claims, when I use the term "a reversible hydrocolloidal composition," I mean a colloidal composition containing water as necessary for its formation, a composition that may be rendered liquid at will or solidified at will, by changing the temperature.

The hexahydric alcohol which I use to the extent of about 70% is an article of commerce known to chemists as sorbite, commonly known as sorbitol, having a composition $$CH_2OH(CHOH)_4CH_2OH,$$

and in commerce is known as sorbitol, a product electrically produced from glucose or corn sugar.

In this specification, when I use the term "mucilaginous vegetable matter," I mean agar-agar, or similar product, and is known to chemists as a galactan, a hemi-cellulose carbohydrate that yields galactose on hydrolysis.

I would like to state here that during the experimentation it has been found that sorbitol evidently dissolves a portion of the agar-agar and, conversely, the agar-agar dissolves a portion of the sorbitol, and in the finished result it is desired that a balance be obtained for durability where both are saturated with each other and no surplus is left. The object to be obtained is that upon setting no excess of sorbitol appears on the surface of the material, but that sufficient has been used to accomplish the objects desired.

When I use the term "trihydric alcohol," I mean glycerin; and when I use the term "suitable salts," I mean a salt suitable for hardening and strengthening the composition, and I have found that the neutral salts of the sodium radical serve this purpose almost perfectly; for example, NaCl.

It appears that in the mechanical mixture of sorbitol and agar-agar associated with water a mechanical association occurs which, from want of knowledge, the applicant would hardly call a chemical compound, but would say a reversible colloidal mixture is formed by this association, which has been found to be the basis of the composition mentioned.

I will further state that I have used sorbitol C. P., known as the technical grade No. 2, d-sorbitol, and have also used commercial sorbitol containing a certain quantity of other closely polyhydric bodies whose physical and chemical properties are very similar to those of sorbitol, but have found their presence to be unobjectionable; as the commercial grade is cheaper, that is what I prefer, and this specification is based upon the commercial grade. I will state, however, that in the use of C. P. sorbitol, which is in the dry form (the commercial sorbitol being in the fluid form), considerable water had to be used in the C. P. sorbitol and it had practically to be brought to the condition of commercial sorbitol before it could be used as herein set forth.

It is well known that two dry substances are almost incapable of intimate association, but by using one of them in a liquid or fluid form an intimate association may be immediately obtained. This is one of the reasons why I find the commercial sorbitol more convenient for use than the C. P. sorbitol, and also because the former is cheaper. The other ingredients in the commercial sorbitol are negligible in this product, such ingredients consisting of a little additional sugar and also salts as impurities, both, as stated, being of negligible character.

Recapitulating, I would say that I have used C. P. sorbitol of the chemical constituency of $C_6H_8(OH)_6$ and, by the addition of water thereto and making it into a fluid paste, or syrup, and using it exactly as set forth in this specification, I have obtained the result exactly as set forth herein for the commercial sorbitol and it is, to all intents and purposes, chemically as well as commercially the same.

I have found that agar-agar has a variable setting and melting temperature, and as used in my compound sets between the temperatures of 40° C. and 45° C., and permits a melting of the material between temperatures of 95° C. and 100° C.

I have not described, and do not claim, the addition of other ingredients to my plastic substance which have been found useful for various purposes; such as, waxes and other substances which may be added to prevent the plastic sticking to the model, or coloring matters, perfumes or flavors. The addition of such ingredients in the proper manner does not affect my plastic in its fundamental use.

Having thus described my invention, what I claim and desire to secure by Letters Patent is:

1. A plastic impression material comprising, in part, sorbitol and agar-agar in relative proportions to form a colloidal mass as a base for molding and casting purposes.

2. A plastic material in the molding and casting art containing sorbitol and agar-agar, the temperature melting point and the solidifying point of which is about that of the said agar-agar.

3. A plastic melting between 95° C. and 100° C. and setting between 40° C. and 45° C. comprising, in part, agar-agar and sorbitol.

4. A plastic comprising, in part, agar-agar and sorbitol, said plastic having a melting temperature between 95° C. and 100° C. and a solidifying temperature between 40° C. and 45° C.

5. A plastic material containing, in part, agar-agar and sorbitol.

6. A plastic material containing, in part, agar-agar and sorbitol, the plastic melting between 95° C. and 100° C. and solidifying between 40° C. and 45° C. and when solidified being pliable.

7. A composition of a plastic impression material the major portion of which consists of the elements agar-agar dissolved in sorbitol and sorbitol dissolved in agar-agar to the substantial saturation point of each, the relative proportions being such that the melting and solidifying temperature of the composition retains the characteristics of the element agar-agar and the strength of the composition containing the characteristic of the element sorbitol acting as a strengthener of the agar-agar, the same being within wide ranges of each but of substantial quantities of each.

8. A composition of a plastic impression material the major portion of which consists of the elements agar-agar dissolved in sorbitol and sorbitol dissolved in agar-agar to the substantial saturation point of each, the relative proportions being such that the melting and solidifying temperature of the composition retains the characteristics of the element agar-agar and the strength of the composition containing the characteristic of the element sorbitol acting as a strengthener of the agar-agar, the same being within wide ranges of each but of substantial quantities of each, in combination with glycerine to increase fluidity.

9. A composition of a plastic impression material the major portion of which consists of the elements agar-agar dissolved in sorbitol and sorbitol dissolved in agar-agar to the substantial saturation point of each, the relative proportions being such that the melting and solidifying temperature of the composition retains the characteristics of the element agar-agar and the strength of the composition containing the characteristic of the element sorbitol acting as a strengthener of the agar-agar, the same being within wide ranges of each but of substantial quantities of each, in combination with glycerine to increase fluidity of the impression material, and a hardening salt to increase solidity.

CARL DAME CLARKE.